(12) United States Patent
Chung

(10) Patent No.: US 6,553,215 B1
(45) Date of Patent: Apr. 22, 2003

(54) WEATHER RADIO CONTROL

(76) Inventor: Kim-Por Chung, Flat D, 7/F., May Wah Building, 42 Smithfield Road, Kennedy Town, Western, Hong Kong (CN)

( * ) Notice: Subject to any disclaimer, the term of this patent is extended or adjusted under 35 U.S.C. 154(b) by 488 days.

(21) Appl. No.: 09/627,169

(22) Filed: Jul. 27, 2000

(51) Int. Cl.$^7$ .................................................. H04B 1/00
(52) U.S. Cl. ..................... 455/218; 455/161.1; 455/404
(58) Field of Search ........................... 455/161.1, 161.2, 455/161.3, 179.1, 184.1, 212, 218, 219, 404

(56) References Cited

U.S. PATENT DOCUMENTS

| | | | | |
|---|---|---|---|---|
| 4,063,179 A | * | 12/1977 | Brown | 455/218 |
| 4,392,248 A | * | 7/1983 | Eckels et al. | 455/161.3 |
| 4,633,515 A | * | 12/1986 | Uber et al. | 455/161.3 |
| 5,428,826 A | * | 6/1995 | Masaki | 455/161.2 |
| 5,710,992 A | * | 1/1998 | Sawada et al. | 455/161.2 |

* cited by examiner

*Primary Examiner*—Quochien Vuong
(74) *Attorney, Agent, or Firm*—David W. Wong

(57) ABSTRACT

This system is for automatically controlling a radio receiver to provide an audible broadcast of the weather alert from weather stations. It may also be incorporated in a multi-band radio for automatically switching between AM/FM broadcast and weather alert broadcast. A scanning means operates continuously to tune the weather band portion of the receiver automatically in a stepping manner to receive signals from the weather stations regardless of whether the receiver is operating in any selected AM or FM broadcasting in the multi-band radio. A combination switching comparator and switching means automatically switch the system over to the weather broadcast when a weather alert signal is detected. The switching means also automatically switches the system back to the original selected broadcast after the termination of the weather alert broadcast.

10 Claims, 2 Drawing Sheets

WEATHER RADIO CONTROL

BACKGROUND OF THE INVENTION

This invention relates to an automatic control system for receiving a weather alert broadcast, and more particularly a radio system which operates automatically for receiving and broadcasting a weather alert from weather stations.

Weather alerts are broadcasted by weather stations in various regions covering different parts of the country and the world. Weather radios are receivers for listening to such weather alert broadcasts in weather bands operated in the frequency modulated (FM) signal. Heretofore, weather alerts radio receivers operate to receive first a weather alert alarm signal, and after hearing the alarm signal, it is necessary for the user to switch the receiver manually to the broadcasting mode of the weather station in order to listen to the actual weather alert broadcast. Such systems are, for example, shown in U.S. Pat. No. 4,633,515 to Uber et al, and U.S. Pat. No. 4,392,248 to Eckels et al. Since the weather radio user may not be located immediately near to the receiver to switch it over to the broadcasting mode, or that the user may be preoccupied with other tasks and is unable to operate the change over switch, the operation of such system is therefore awkward and inconvenient to carry out. Furthermore, it is necessary for the listener to change the tuning of the receiver manually to a different channel so as to receive a broadcast from each different weather station.

A weather band may be incorporated in a multi-band radio receiver which may be operated to receive broadcasts from any of the AM, FM, or weather band selectively. However, the drawback in such multi-band radio receiver is that each broadcast band operates independently such that the weather alert alarm signal can not be received when the radio is operating in either the AM or FM band. The radio must be set at the weather band at all times in order to receive the weather alert alarm signal. The ambient noise in such weather broadcast band is quite high during the absence of any weather alert alarm such that it is annoying to the user. For this reason, users tend to turn off the weather band entirely, resulting in the danger of not receiving any weather alert alarm signal.

SUMMARY OF THE INVENTION

It is a principal object of the present invention to provide a control system which operates automatically for controlling the weather band radio for receiving and broadcasting the weather alert announcement.

It is another object of the present invention to provide a weather alert radio receiver having selective automatic mode and manual mode which operate to receive and to broadcast a weather alert announcement from various weather stations.

It is yet another object of the present invention to provide a control system for a multi-band AM/FM and weather band radio receiver which operates automatically for receiving and broadcasting weather alert announcements regardless of any selected band it is normally operating, and it will also automatically return to the originally selected AM or FM band at the termination of the weather alert broadcast.

The multi-band radio receiver of the present invention includes AM and FM bands for receiving AM and FM broadcasts and a weather band for receiving weather warning alert and weather broadcast from a plurality of weather stations to provide automatically an audible output of the weather warning alert and the weather broadcast regardless of whether or not the receiver is normally operating in the AM or FM band or the weather band. The broadcasts are announced by an audio means of the receiver. The receiver includes an automatic control comprises a frequency stepping circuit means operative continuously for scanning and tuning the receiver to search the plurality of weather stations for the weather alert and weather broadcast transmitted by a carrier frequency signal. A detecting means is adapted to segregate the weather warning alert and weather broadcast from the carrier frequency signal. A squelch circuit means is connected to the detecting means and in combination therewith adapted to determine the presence of the weather warning alert and the weather broadcast. A filter means is connected to the detecting means and is adapted to provide a trigger output signal in response to the weather warning alert. An alert audio oscillator means is connected to the filter means and is adapted to generate a unique alert signal when a weather warning alert is received. A switching comparator means coupled to the detecting means and is adapted to provide an actuation output signal when the weather warning alert and weather broadcast are present. A switching means is connected to the switching comparator means and the alert audio oscillator means and is operative by the actuation output signal for conveying the unique alert signal and weather broadcast to the audio means. An auto lock circuit means is coupled to the frequency stepping circuit means and the detecting means and is operative to lock the frequency stepping circuit means at one of the plurality of weather stations which is presently announcing the weather warning alert and the weather broadcast. An AM/FM output switch means is connected to the squelch circuit means and is adapted to disconnect the AM or FM broadcast from the audio means while the unique alert signal and weather broadcast is being announced by the audio means, and it will re-connect the selected AM or FM broadcast to the audio means at the termination of the announcement of the unique alert signal and the weather broadcast.

DETAILED DESCRIPTION OF THE PREFERRED EMBODIMENT

Figure 1:
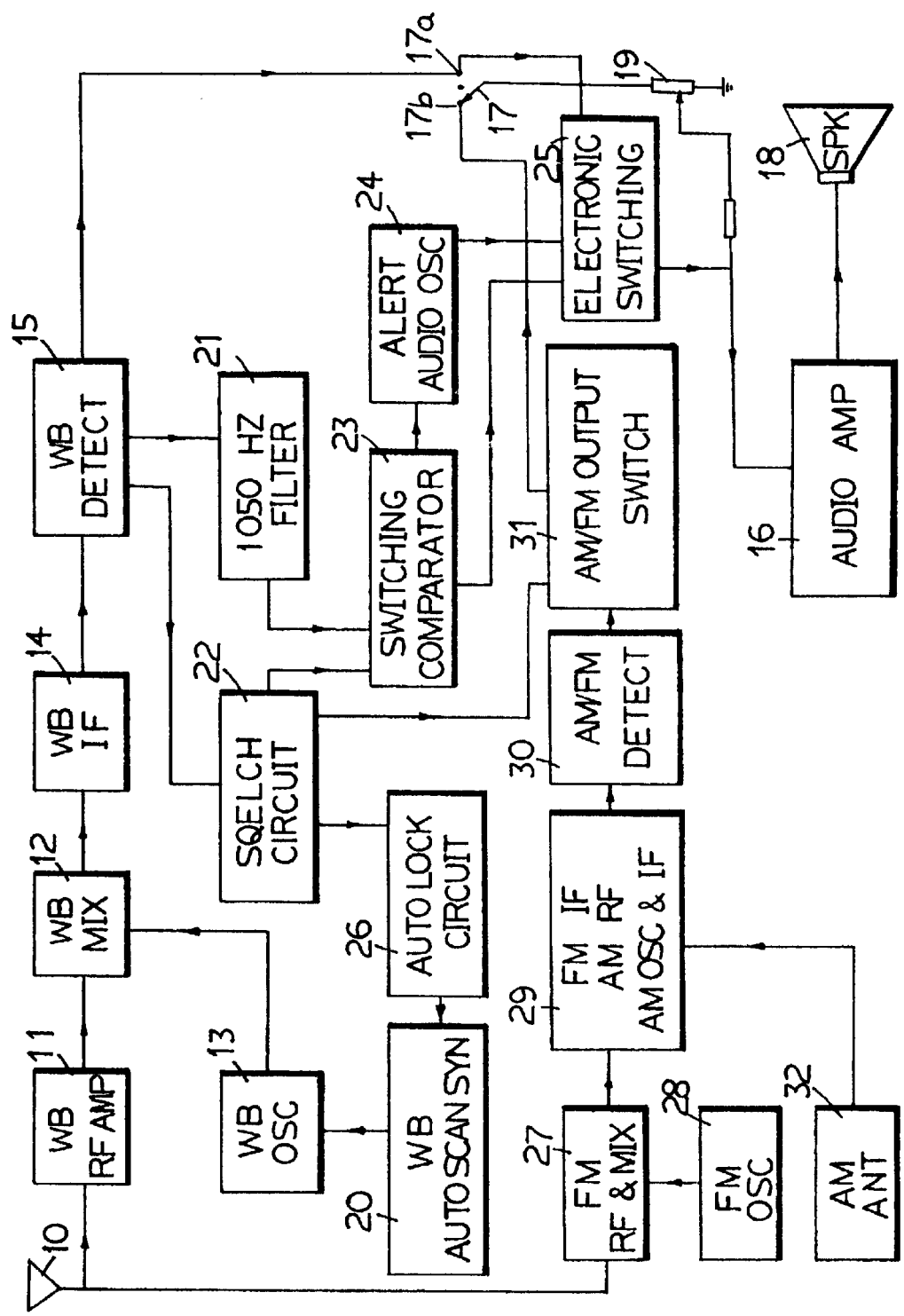
FIG. 1 is a block diagram of an automatic multi-band AM/FM and weather alert broadcasting radio receiver having a control system according to the present invention.

With reference to the drawings wherein like reference numerals designate corresponding parts, as best shown in FIG. 1, weather alerts are broadcasted by various weather stations in a number of regions covering different parts of the country to indicate potential and current adverse weather conditions. Weather alerts are broadcasted in the frequency modulated FM signal by the weather stations. Such broadcast in a frequency modulated FM signal in high frequency is received through the antenna 10, it is amplified initially by a radio frequency amplifier, WB RF amplifier 11. The amplified signal is applied to a mixer 12 in which it is mixed with the oscillation signal generated by an oscillator 13 which is tuned to the broadcasting frequency of the weather station. An output signal having a frequency combination including an intermediate frequency of 455 KHz is produced by a mixer 12. This output signal is then amplified by an intermediate amplifier 14 to a large amplitude FM signal containing the carrier radio frequency as well as the actual audio weather alert warning signal and weather broadcast. The amplified FM signal is then processed by a detector 15 to retrieve the weather alert signal and the weather broadcast from the carrier frequency. If the output of the detector 15 is connected directly to an audio amplifier 16 through the contact 17a of a selection switch 17, the weather broadcast without the alert warning would be announced by the speaker 18. The volume of the audio level may be selected by a volume control 19 provided between the detector 15 and the audio amp 16. However, the above common weather band receiver requires the receiver to be activated at all time in order to listen to the weather alert and weather broadcast. Since the ambient noise of the weather bands is quite high when there is no weather broadcast, listeners tend to turn off the receiver, resulting in not hearing the adverse weather broadcast. The present invention provides an automatic control having an auto scan synchronizing circuit 20 which operates continuously to tune the oscillator 13 in a step manner through all the broadcasting frequencies of the weather stations. A filter 21 and a squelch circuit 22 are coupled to the detector 15. The filter 21 segregates the alert warning signal such that when there is an alert warning signal broadcasted by any weather station, the output of the filter 21 will be high. The squelch circuit 22 detects the presence of the weather broadcast signal such that its output would be high when there is a weather alert broadcast. Both outputs of the squelch circuit 22 and filter 21 are applied to a switching comparator 23 which will turn on an audio oscillator 24 which generates a unique audio tone for warning the listener of the presence of a weather alert warning signal. When both inputs of the switching comparator 23 are high, namely, there is a weather alert warning signal as well as a weather broadcast, the switching comparator 23 will activate an electronic switching circuit 25 to first direct the unique audio tone signal to the audio amp 16 to provide an audible output by the speaker 18 followed by connecting the output from the detector 15 to the audio amp 16 to announce the weather broadcast. An auto lock circuit 26 is coupled between the squelch circuit 22 and the auto scan synchronizing circuit 20. When a weather broadcast is detected by the squelch circuit 22, the auto lock circuit 36 would temporarily lock the stepping operation of the auto scan synchronizing circuit 20 at the weather station presently announcing a weather alert broadcast. At the termination of the weather broadcast, when the squelch circuit 22 no longer detects a weather broadcast, it will de-activate the auto lock circuit 26 to return the tuning auto scan synchronizing circuit 20 again to the scanning operation for tuning the weather band receiver to the various weather stations to search for any weather alert signal and weather broadcast.

An AM and FM receiver may be incorporated in the present weather band receiver to provide a multi-band receiver. The FM broadcast is received through the antenna 10, and, in a conventional manner the signal is mixed in a mixer 27 with the tuning frequency generated by an FM oscillator 28 so as to select an FM station and to produce an output consisting of the frequency combinations including the intermediate frequency of 455 KHZ. The intermediate frequency is processed in an IF circuit 29 which discriminates other frequencies except the intermediate frequency and selectively amplifies this high frequency signal. The audio FM signal is obtained in an AM/FM detector 30 by stripping off the carrier radio frequency. The audio FM signal is passed through an AM/FM output switch circuit 31 which normally connected the audio signal through the contact 17b of the selection switch 17 and volume control 19 to the audio amplifier 16 and finally to the speaker 18 to provide the audible output of the selected FM broadcast. Similarly, an AM broadcast is received through the AM antenna 32. The AM signal is tuned and amplified by the AM portion of the IF circuit 29 which serves as the AM radio frequency tuning and intermediate frequency amplification. The AM signal is detected and segregated by the detector 30 and it is connected to the audio amplifier 16 through an AM/FM output switch circuit 31, the contact 17b of selection switch 17 and volume control 19, and subsequently to the speaker 18 to provide the audible output of the selected AM broadcast. The AM/FM output switch circuit 31 normally connects the audio signal to the audio amplifier 16 to the speaker 18. However, it will be de-activated by the squelch circuit 22 when the squelch circuit 22 detects a weather broadcast, so that during the announcement of the weather broadcast, the AM and FM receivers are disconnected from the audio amplifier 16 and the speaker 18. Accordingly, the multi-band combination radio receiver of the present invention, allows the receiver to be operated normally for listening to the AM or FM broadcast and yet when a weather alert signal and weather broadcast are detected, the receiver would automatically disconnect the AM or FM broadcast from the audio amplifier 16 and would connect the weather receiver portion to the audio amplifier 16 instead. At the termination of the weather broadcast, the electronic switching circuit 25 will disconnect the weather receiver portion from the audio amplifier 16 while the AM/FM output switch circuit 31 will re-connect the AM or FM broadcast signal to the audio amplifier 16 and to the speaker 18 to resume listening to the originally selected AM or FM broadcast. In the above manner, the listener would not miss listening to any weather alert broadcast from any weather station. This is particularly important for a traveller in a vehicle moving from a region covering by one weather station into another region covering by another weather station broadcasting an adverse weather alert.

Figure 2:
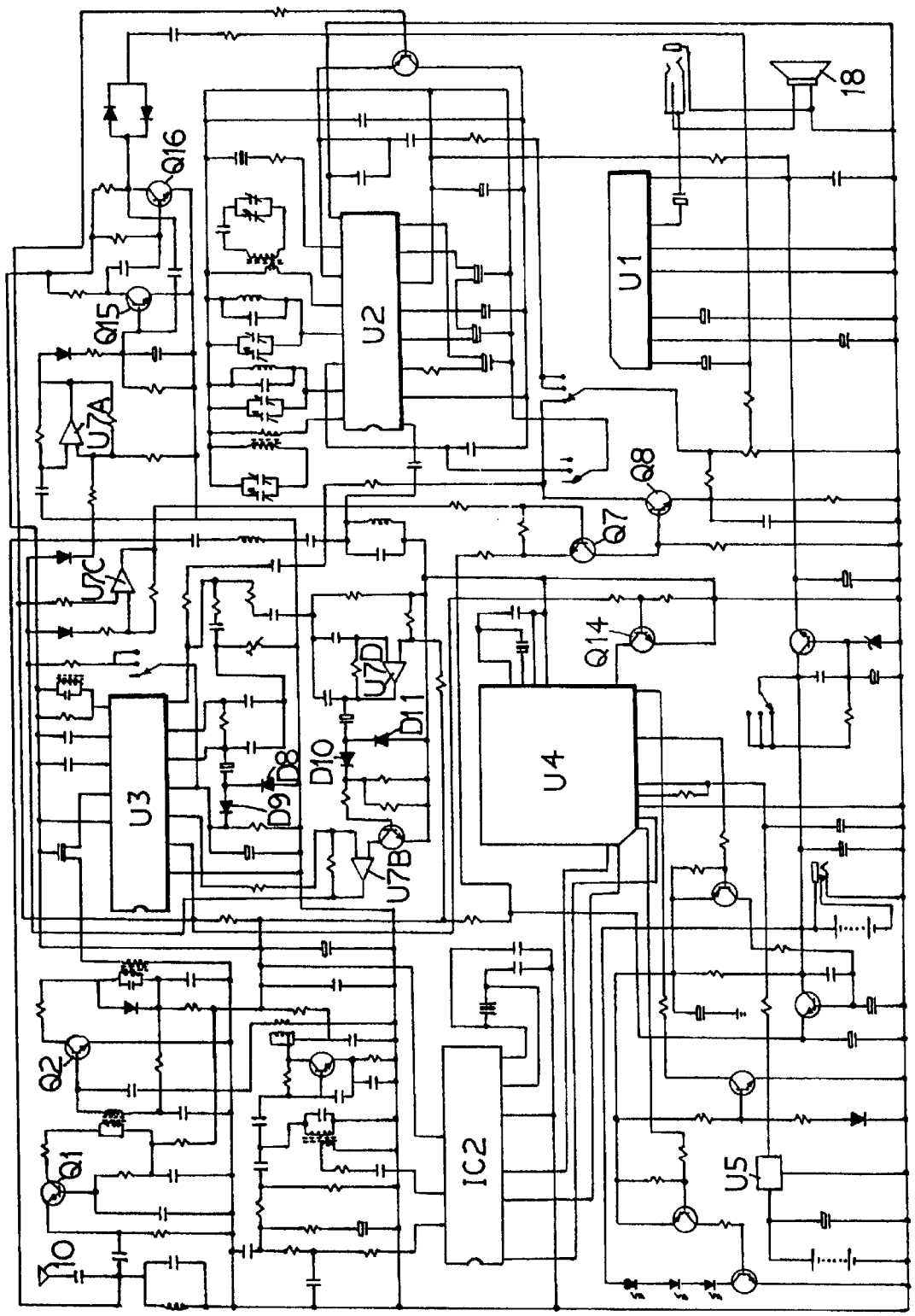
FIG. 2 is a schematic circuit diagram showing an exemplary embodiment of the radio receiver operative for carrying out the present invention.

As shown in the exemplary embodiment of the schematic circuit diagram FIG. 2, any signal from a weather station is received by the antenna 10 and it will be amplified by the RF amplifier including the transistor Q1, the signal is outputted to the mixer having transistor Q2. A detector and squelch integrated circuit U3 provides the IF and detect functions for the signal. While the squelch integrated circuit U3 in combination with diodes D9 and D8 determines the existence of the weather alert alarm in the signal. In the existence of a weather alert alarm signal, the output of the squelch integrated circuit U3 will turn on the transistor Q14 to activate the CPU U4 so as to lock the auto scan synchronizing circuit IC2 at the particular weather station having a weather alert broadcast as well as turning on transistors Q7 and Q8 to connect the weather band to the audio amplifier U1 in order that the weather alert broadcast will be outputted to the audio amplifier U1 for announcing by the speaker 18. In absence of the weather alert alarm signal, the auto scan synchronizing circuit IC2 in combination with the oscillator operates continuously for tuning the receiver in a stepping fashion through various predetermined carrier frequencies of the weather stations to seek for any weather alert and weather broadcast.

In the multi-band radio embodiment shown in FIG. 2, AM and FM receiver portions are also incorporated into the circuit. Normally, the system is set at a selected broadcast in either the AM or the FM band, and transistors Q7 and Q8 are turned on to connect the selected AM or FM broadcast to the audio amplifier control U1 to operate the speaker 18. In the meantime, the weather band portion of the radio operates continuously as described above while the selected AM or FM receiver portion is in operation. As soon as a weather alert alarm signal is detected by the squelch integrated circuit U3, it will also activate the AM/FM output switch circuit to disconnect the AM or FM broadcast to the audio amplifier so that only the weather band portion is connected to the audio amplifier to provide the audio output of the weather alert announcement. At the termination of the weather alert announcement, the squelch integrated circuit U3 will cause the auto synchronizing circuit IC2 to resume its stepping tuning operation through the weather stations and simultaneously will also activate the AM/FM output switch circuit to re-connect the previously selected AM or FM to the audio amplifier so as to resume the original AM or FM broadcast.

It will be appreciated by those skilled in the art that a manually operated multi-selection tuning switch may be used to replace the auto scan synchronizing circuit 20. The tuning switch is connected to the CPU U4 and adapted to tune the weather band portion to the predetermined weather stations, one at a time in a stepping manner, each time the tuning switch is operated. Also, other television receiver bands may be incorporated into the present multi-band radio receiver similar to the AM and FM band as described above.

While the present invention has been described in detail with regard to the preferred embodiment, it is appreciated that other variations of the present invention may be devised which do no depart from the inventive concept of the present invention.

What is claimed is:

1. In a weather radio receiver for receiving weather broadcast signal and weather warning alert signal from a plurality of weather stations and providing an audible warning alert and weather broadcast by an audio output means therein, said receiver having an automatic control system comprising, an auto scan synchronizing circuit means operative continuously for tuning said receiver in a stepping manner through a plurality of predetermined carrier frequencies of said weather stations to search for said weather warning alert signal and weather broadcast signal, a detecting means adapted to segregate said weather alert signal and weather broadcast signal from said carrier frequency signal, a squelch circuit means in combination with said detecting means operative to determine the presence of said weather alert signal and weather broadcast signal, a switching comparator means coupled to said detecting means and said squelch circuit means and adapted to provide an actuation output signal when said weather alert signal and weather broadcast signal are present, a switching means connected to said switching comparator means and operative to be actuated by said actuation output signal from said switching comparator means for connecting said weather alert signal and weather broadcast signal to said audio output means for announcing said weather alert and weather broadcast, an auto lock circuit means coupled to said frequency stepping circuit means and said squelch circuit means and operative to lock said auto scan synchronizing circuit means at a weather station presently broadcasting said weather warning alert and said weather broadcast.

2. An automatic control system according to claim 1 wherein said audio output means includes an audio amplifier and a speaker, and a volume control means connected between said audio amplifier means operative for varying sound output level of said speaker.

3. An automatic control system according to claim 2 including an alert audio oscillator means coupled to said switching comparator means and operative to generate a unique alert audio signal when a warning alert signal is detected by said receiver, said unique alert audio signal being directed to said audio amplifier means for amplifying said unique alert audio signal to provide an audible output of said unique alert audio signal by said speaker.

4. A multi-band radio receiver having AM and FM bands for receiving AM and FM broadcasts, and a weather band for receiving weather warning alert and weather broadcast from a plurality of weather stations to provide automatically an audible output of said weather warning alert and said weather broadcast by an audio means, said receiver being operative normally selectively in said AM and FM bands for providing selectively AM and FM broadcasts by said audio means, said receiver having an automatic control comprising, an auto scan synchronizing circuit means operative continuously for tuning said receiver to search said weather stations in a stepping manner for said weather warning alert and weather broadcast transmitted by a carrier frequency signal, a detecting means adapted to segregate said weather warning alert and weather broadcast from said carrier frequency signal, a squelch circuit means connected to said detecting means and adapted to determine presence of said weather warning alert and weather broadcast, a filter means connected to said detecting means and adapted to provide a trigger output signal in response to said weather warning alert, an alert audio oscillator means connected to said filter means and adapted to generate a unique alert signal, a switching comparator means coupled to said filter means and said squelch circuit means and adapted to provide an actuation output signal when said weather alert and weather broadcast are present, a switching means connected to said switching comparator means and said alert audio oscillator means and operative by said actuation output signal for conveying said unique alert signal and weather broadcast to said audio means, an auto lock circuit means coupled to said frequency stepping circuit means and said squelch circuit means and operative to lock said auto scan synchroning circuit means at one of said plurality of weather stations presently announcing said weather warning alert and weather broadcast, an AM/FM output switch means connected to said squelch circuit means and adapted to disconnect said AM and FM broadcast from said audio output while said unique alert signal and weather broadcast are being announced by said audio means.

5. A multi-band radio receiver according to claim 4 wherein said AM/FM output switch means is operative automatically to re-connect said AM and FM broadcast to said audio means at the termination of announcement of said unique alert signal and weather broadcast by said audio means.

6. A multi-band radio receiver according to claim 5 including a manual switching means connected to said AM/FM output switch means and said switching means and being operative for selectively connecting said AM/FM broadcast and said weather broadcast directly to said audio means.

7. A multi-band radio receiver according to claim 6 wherein said audio means includes an audio amplifier means and a speaker, and a volume control means operative to varying sound level of said speaker.

8. A multi-band radio receiver according to claim 7 wherein said switching means in an electronic switching circuit means operative to override said manual switching means.

9. A multi-band radio receiver according to claim 8 wherein said auto scan synchronizing circuit means includes an electronic switching member operative automatically for tuning said receiver to said plurality of weather stations in a stepping manner.

10. A multi-band radio receiver according to claim 8 including a multi-section switch means connected to said auto scan synchronizing circuit means and adapted to operate said auto scan synchronizing circuit means in a stepping manner for tuning said receiver to a selected one of said weather stations.

* * * * *